May 12, 1931.  E. GEIGER  1,805,211
AUTOMOBILE GUIDING APPARATUS
Filed March 6, 1929   2 Sheets-Sheet 1
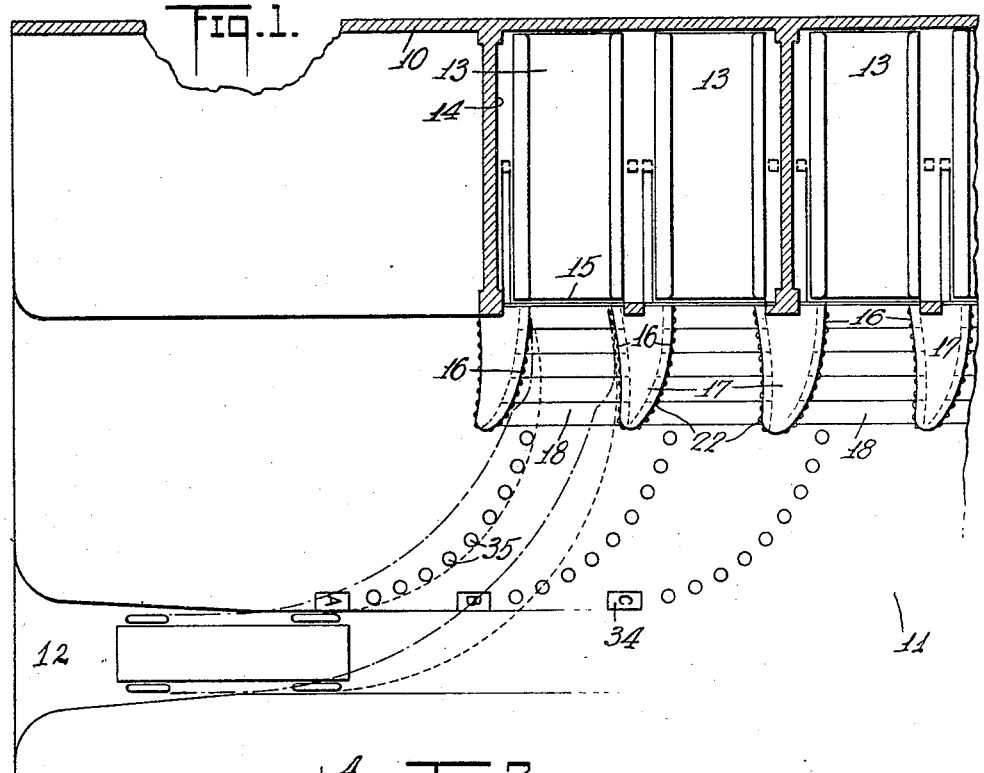
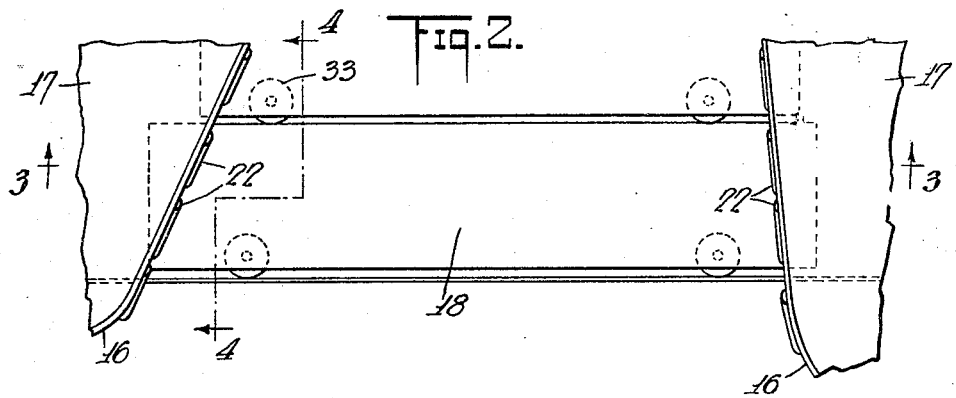
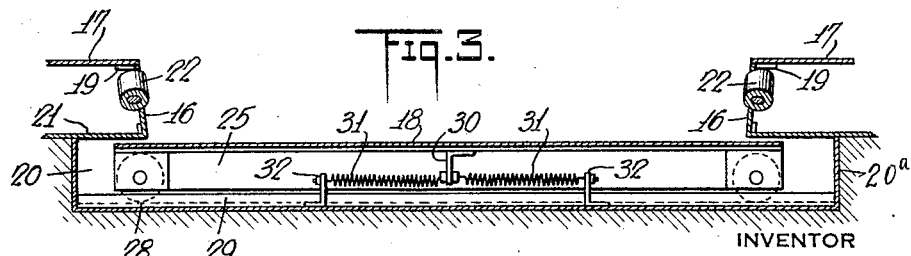
INVENTOR
*Ernst Geiger*
BY
*Franklin J. Foster*
ATTORNEY May 12, 1931.  E. GEIGER  1,805,211
AUTOMOBILE GUIDING APPARATUS
Filed March 6, 1929  2 Sheets-Sheet 2
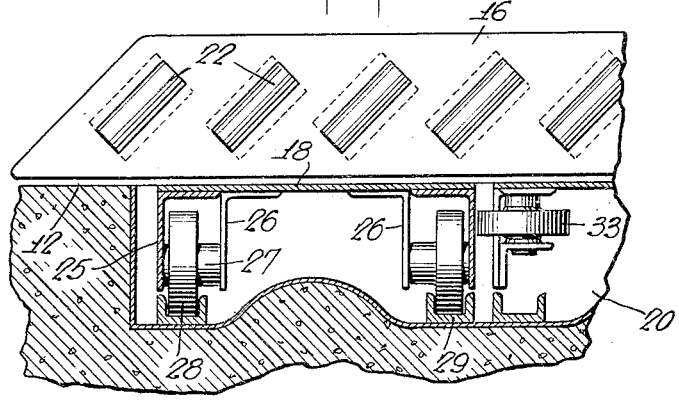
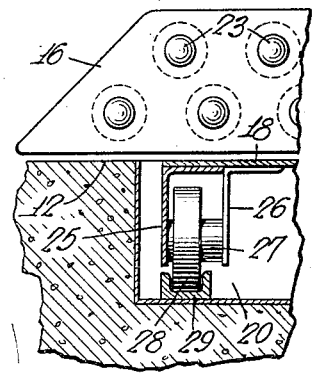
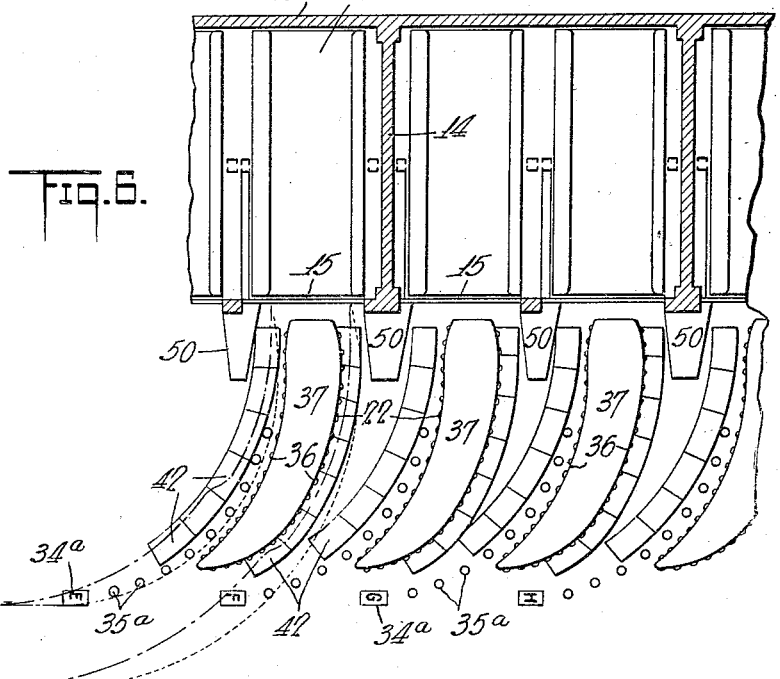
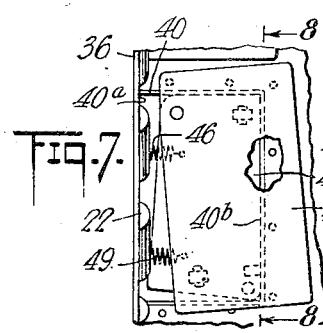
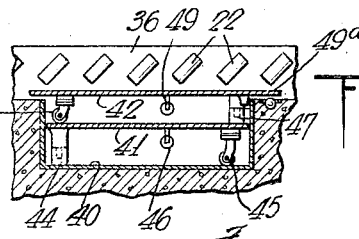
INVENTOR
*Ernst Geiger.*
BY
*Franklin J. Foster*
ATTORNEY Patented May 12, 1931

1,805,211

UNITED STATES PATENT OFFICE

ERNST GEIGER, OF IRVINGTON, NEW JERSEY

AUTOMOBILE GUIDING APPARATUS

Application filed March 6, 1929. Serial No. 344,678.

The present invention in its broader aspects is concerned with the provision of means for mechanically aiding to guide a steerable vehicle, such, for instance, as an automobile, in a particular path or through a restricted opening.

The guiding means is an emergency wheel guide apparatus designed to assist unskillful drivers to steer their cars through or into locations where extreme skill would ordinarily be required.

One especially important field of usefulness is in a parking garage of the character disclosed in my prior Patent No. 1,636,600, dated July 19th, 1927, in which cars driven longitudinally of a car receiving floor must be swung sharply to the left and steered into a waiting parking cabin, these cabins being arranged in a bank of elevator shaftways.

It will be apparent that unskillful manipulation of the car in driving it into the cabin will seriously delay a stream of incoming cars and that if the car is parked askew on the elevator or cabin it will be difficult for the driver to alight from the car and squeeze his way out of the elevator. Inasmuch as these time consuming factors are of great importance and inasmuch as the space factor is also important in this type of garage and it is undesirable to use cabins of such ample capacity that every amateur can drive a car onto or into them and still have room to get out of the car, the present invention provides a highly desirable mechanism for insuring that each car is driven straight into its cabin, even though the driver manipulates the car carelessly.

By use of the apparatus but a modicum of care is necessary on the part of the driver to insure absolutely accurate and expeditious emplacement of the car in the desired cabins or parking space.

There are numerous disadvantages in attempting to guide a car into a stall or through a narrow doorway by the use of stationary guiding curbs. In the first place the friction of the tires on the curbs is liable to seriously injure the tires and this friction is such that unless the curbs are exceptionally high the wheels of the car are very apt to jump them. Furthermore, if a driver attempting to negotiate his car between such guiding curbs finds the rear wheels suddenly jolted and bumped by contact with the curb, he is very apt to jam on the brakes and stop the car in the belief that it has met with a serious obstruction.

In accordance with the present invention I employ curb guides of a unique character in that they are associated with yielding or floating car supporting platforms and frictional contact between the wheels to be guided and the stationary curbs is immediately relieved by the floating movement of the platforms under the wheels. In other words, if the car wheels must be pushed or nudged around into proper position by the curbs, the movement is so gentle and so substantially frictionless that it fails to disconcert the driver or injure the tires and permits the use of extremely low curbs since there is practically no possibility of the wheels jumping over them.

The guiding curbs may be of the type which engage the outside of the wheels or of the type which engage the inside of the wheels and I preferably associate with the curb guiding mechanism a marking device which the driver of the car is supposed to follow approximately with the left front wheel. If the driver is sufficiently skillful to keep the wheel anywhere near this line the automatic guiding mechanism will do the rest, gently and unnoticed, and will automatically insure movement of the car in the desired path as it passes through the guides.

Preferably the friction between the tires and curbs is additionally relieved by the use of anti-friction rollers projecting from the faces of the curbs.

An important feature of the invention is the fact that the guiding apparatus is of such extremely simple, rugged, inexpensive construction that it may be conveniently embodied even at little cost as part of the standard equipment of private or public garages or any location where automotive vehicles are to be steered through or into difficult locations, such, for instance as narrow stalls, doorways or elevators.

The invention may be more fully understood from the following description, in connection with the accompanying drawings, wherein:

Fig. 1 is a typical fragmentary sectional plan view showing an elevator garage with the approaches to the elevators equipped with my improved car guide means.

Fig. 2 is a considerably enlarged fragmentary plan view of the guiding curbs and their associated movable platforms.

Fig. 3 is a longitudinal sectional view on the line 3—3 of Fig. 2.

Fig. 4 is an enlarged transverse sectional view on the staggered line 4—4 of Fig. 2.

Fig. 5 is a fragmentary view similar to Fig. 4 but illustrating a slight modification.

Fig. 6 is a sectional plan view generally similar to Fig. 1 but showing a further modified form of guiding means.

Fig. 7 is a top plan view of the modified form of sliding platform shown in Fig. 6, and Fig. 8 is a vertical sectional view on the line 8—8 of Fig. 7.

In Fig. 1 there is shown a rather typical receiving floor plan of an elevator garage which may be of the type disclosed in my prior patent or may involve the use of ordinary elevators for receiving the cars and carrying them to points of storage at various levels above or below the receiving floor. In this view one of the side walls of the garage building is shown at 10, and 11 represents a driveway upon which incoming cars are adapted to enter the garage. These cars are driven along the relatively narrow roadway 12 and then swung sharply to the left and driven into any one of a series of waiting elevators or parking cabins 13 in a bank of elevator shaftways 14.

Details of the elevators form no part of the present invention and are therefore not disclosed. As a matter of fact, whether the members 13 in the present instance represent elevators, car parking cabins or car receiving stalls is immaterial since the present case concerns itself primarily with means for guiding the cars into the restricted receiving conveyors or chambers.

With this in mind the entrance to the doorway 15 of each shaftway is guided by a pair of generally converging stationary guiding curbs 16 and since it is frequently desirable for passengers to alight before the driver takes the car into the elevator the curbs of adjacent doorways are preferably connected by a bridging plate at their tops in order to define a landing platform 17 for passengers.

Disposed substantially flush with the floor or with the roadway 12 and between the converging curbs at each doorway 17 are a transverse series of longitudinally floating or yielding platforms 18, these platforms being designed to prevent undue friction between the wheels of an entering car and the stationary curbs 16 which guide these wheels in the proper direction as the car enters the elevator.

Details of the curbs and the associated movable platforms appear in Figs. 2 to 4 inclusive. Each curb 16 includes an upstanding metal plate inclining slightly outwardly from its top to its bottom and having a flange 19 at its top upon which the platform plates 17 may be secured. The recesses 20 in the floor or driveway which accommodate the platforms 18 and their associated carrying mechanism are preferably lined with metal at 20a and extend laterally under curbs 16. These curbs therefore are supported not directly on the floor but by plates 21 on the garage floor, which project inwardly over the edges of the recesses 20.

Each curb preferably mounts a series of car wheel engaging anti-friction rollers, either of the elongated, slightly inclined roller type 22 of Figs. 1 to 4 or of the ball type 23 of Fig. 5.

The movable platforms 18 for reasons which will more fully hereinafter appear, are of relatively narrow elongated formation. Downwardly turned flanges 25 at the side edges of the platforms cooperate with downwardly extending brackets 26 to provide bearings for the hubs 27 of traction wheels 28, the latter being mounted to travel on rails 29 laid on the bottom of the recesses 20. These rails as shown are of general U-shape in cross-section so that they embrace the traction wheels and preclude the possibility of lateral slipping of the platforms.

The platforms are normally held in central position by coiled restoring springs 31, each anchored at one end of a pendant bracket 30 disposed centrally of the platform and each anchored at its other end to an upstanding bracket 32 fixed to the bottom of the recess 20.

If desired alternate platforms may mount anti-friction rollers 33 journalled for rotation on vertical axes and extending through the flanges 25 of one platform into engagement with the outer surface of the flange of an adjacent platform, these rollers serving additionally to prevent lateral movement of the platforms while reducing the friction between them incidental to a lateral thrust.

Preferably the various stalls or cabins are identified by letters or numbers and as the driver of a car enters the roadway 11 he is assigned to particular cabin say "A", "B" or "C". He proceeds along the right hand side of the roadway 12 until he reaches the floor plate 34 bearing the correct letter, say "A", whereupon he swings his car to the left and guides the left front wheel along the line of markers 35 on the floor. These markers may be painted, inlaid or otherwise produced. Usually they are in the form of a row of illuminated domes flush with the roadway surface.

The thing which renders it difficult for a novice to swing his car sharply and drive it into a restricted space, such for instance, as the cabin 13, is the fact that the front and rear wheels of the car take different paths as the car is swung and while the tyro may readily observe where the front wheels are going he has very indefinite ideas about the direction which the rear wheels are taking.

In Fig. 1 I have shown in dotted lines the path of the front wheels when the guide line 35 is followed and in dot and dash lines the path of the rear wheels. It will be observed that the left rear wheel will strike the left hand curb 16, but as it does so both rear wheels are resting on platforms 18 and these platforms yield readily to the right so that the rear end of the car is slewed around so gently that the driver is not even aware of it, much less disconcerted by it. As soon as the weight of the wheels moves off a displaced platform 18, the latter will be automatically returned by springs 31 to its central or full floating position as will be readily understood.

The curvature of the guiding curbs is such that a car driven with even approximate accuracy along the indicated line 35 will be guided straight ahead into the waiting cabin 13, leaving ample room for the driver to alight and leave the cabin. Usually passengers in the car debark on the platforms 17 before the car is driven into the cabin.

The form of the invention shown in Figs. 6 to 8 inclusive is broadly similar in operation and purpose to the form above discussed, save that here the mechanical guiding means engage the insides of the car wheels rather than the outsides thereof, and a somewhat modified form of floating or yielding platform construction is provided.

Here the car instead of being driven between a pair of converging curbs is driven over a pair of diverging curbs 36. Its wheels, however, rest upon yielding platforms having the same function as platforms 17, so that upon engagement of a car wheel with the curbs which are straddled, a similar gentle nudging or slewing of the car occurs to guide it in the proper direction.

The curbs 36 with their connective platform plate 37 provide a unit of generally semi-crescent shape with its truncated end adjacent and immediately in front of the cabin 13, and its tapering tail swinging toward the entrance end of the roadway 12.

Guiding lines or markers 35a corresponding to the markers 35 are provided and these lines of markers terminate at identified floor plates 34a similar to plates 34. An arcuate continuous row of movable platforms is provided adjacent each side of the curb unit and the details of these platforms are best seen in Figs. 7 and 8.

A row of open topped metal lined pockets 40 of general rectangular shape accommodate each a pair of superimposed metal plates or platforms 41, 42. One corner of lower plate 41 is pivoted to a stud 44 on the bottom of the pocket and the free corners of the plate supported on casters 45 riding on the bottom of the pocket. A restraining spring 46 tends to swing plate 41 against what may be termed the rear wall 40a of the pocket, but the plate can swing outwardly around its pivot until it abuts front pocket wall 40b as will be later explained.

The upper plate 42 is pivoted adjacent one corner at 47 upon plate 41 and its free corners are supported on casters 48 riding on the plate 41, the pivot of one plate being diagonally opposite to that of the other. Plate 42 is preferably somewhat larger than the pocket 40 and arranged slightly above the roadway level so that it can swing out over the roadway about pivot 47 and against the action of restraining spring 49 to an extent limited by stop lugs 49a.

In operation, when the wheel of an incoming car strikes the curb 36 or the rollers 22 associated therewith, the plates 42 will yield either individually about pivots 47 or simultaneously with plates 41 about pivots 44, depending upon the particular location of the wheel at the time it strikes the curb. This compound or jointed pivoted plate arrangement has all the advantages of a free floating slide plate, yet it is less complex in structure.

In Fig. 6 I have again shown the course of the front wheels of a car (dotted lines) and rear wheels (dot and dash lines) as the car swings over the guide and enters cabin 13, and it will be noted how, when the right rear wheel strikes the curb both rear wheels are gently swung around due to the yielding platforms until they assume the correct positions for entering the cabin 13.

With this form of the invention, passenger landing platforms 50 wholly independent of the car guiding means may be employed between the semi-crescent shaped curb units and out of the path of the cars.

It will be evident that either form of guiding means is equally effective for guiding a car out of the cabins (either frontwardly or rearwardly) and that the illustrated use of the guides is merely typical of one of many ways in which they may be utilized.

It will thus be seen that there is herein described a device in which the several features of this invention are embodied, and which device in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

What I claim is:

1. A vehicle guiding means including a stationary curb adapted to engage the wheel of a vehicle and a laterally yieldable platform arranged in operative relationship to the curb and upon which the wheels of the vehicle are adapted to travel.

2. A vehicle guiding means including a stationary curb adapted to engage the wheel of a vehicle and a laterally yieldable platform arranged in operative relationship to the curb and upon which the wheels of the vehicle are adapted to travel, and a plurality of anti-friction rollers projecting from the wheel engaging face of the curb.

3. A vehicle guiding means including a stationary curb adapted to engage the wheel of a vehicle and a laterally yieldable platform arranged in operative relationship to the curb and upon which the wheels of the vehicle are adapted to travel, spring means tending to restrain movement of said platform.

4. A vehicle guiding means including a stationary curb adapted to engage the wheel of a vehicle and a laterally yieldable platform arranged in operative relationship to the curb and upon which the wheels of the vehicle are adapted to travel, spring means tending to restrain movement of said platform, and normally holding the latter in a central neutral floating position from which it is movable under the impetus of the vehicle in two directions.

5. A vehicle guiding means including a stationary curb adapted to engage the wheel of a vehicle and a laterally yieldable platform arranged in operative relationship to the curb and upon which the wheels of the vehicle are adapted to travel, traction wheels supporting said platform.

6. A guiding apparatus for automobiles including a pair of stationary curbs, a series of floating roadway sections between the curbs yieldable laterally under the weight of a car when a wheel of the latter strikes one of the curbs.

7. A guiding apparatus for automobiles including a pair of stationary curbs, a series of floating roadway sections between the curbs yieldable laterally under the weight of a car when a wheel of the latter strikes one of the curbs, said roadway sections comprising elongated platforms disposed transversely of the roadway.

8. A guiding apparatus for automobiles including a pair of stationary curbs, a series of floating roadway sections between the curbs yieldable laterally under the weight of a car when a wheel of the latter strikes one of the curbs, said roadway sections comprising elongated platforms disposed transversely of the roadway, means to guide said platforms for axial movement.

9. A guiding apparatus for automobiles including a pair of stationary curbs, a series of floating roadway sections between the curbs yieldable laterally under the weight of a car when a wheel of the latter strikes one of the curbs, said roadway sections comprising elongated platforms disposed transversely of the roadway, means to guide said platforms for axial movement, spring means tending to restrain such movement.

10. A guiding apparatus for automobiles including a pair of stationary curbs, a series of floating roadway sections between the curbs yieldable laterally under the weight of a car when a wheel of the latter strikes one of the curbs, said roadway sections comprising elongated platforms disposed transversely of the roadway, and anti-friction means interposed between adjacent platforms to sustain lateral thrusts on the latter.

11. In a car guiding apparatus for association with a roadway or the like to guide a car in a predetermined path, a pair of low stationary generally vertical guiding walls adapted to engage the wheels of a car if they move laterally beyond a predetermined distance in either direction, and a yieldable floor plate arranged in operative position to the walls and upon which the car wheels are adapted to travel, said floor plate being movable bodily with the car to relieve friction between the car wheels and the guiding walls.

12. In a car guiding apparatus for association with a roadway or the like to guide a car in a predetermined path, a pair of low stationary generally vertical guiding walls adapted to engage the wheels of a car if they move laterally beyond a predetermined distance in either direction, and a yieldable floor plate arranged in operative position to the walls and upon which the car wheels are adapted to travel, said floor plate being movable bodily with the car to relieve friction between the car wheels and the guiding walls, said floor plate comprising a plurality of independent sections arranged in juxtaposed relationship.

13. In a car guiding apparatus for association with a roadway or the like to guide a car in a predetermined path, a pair of low stationary generally vertical guiding walls adapted to engage the wheels of a car if they move laterally beyond a predetermined distance in either direction, and a yieldable floor plate arranged in operative position to the walls and upon which the car wheels are adapted to travel, said floor plate being movable bodily with the car to relieve friction between the car wheels and the guiding walls, said floor plate comprising a plurality of independent sections arranged in juxtaposed relationship, and movable transversely of the roadway and spring means tending to restrain such movement.

14. In a car guiding apparatus a pair of low guiding curbs and anti-friction rollers projecting from the faces of said curbs for engagement with the wheels of a car to be guided by the curbs.

15. A vehicle guiding means including a stationary curb adapted to engage the wheel of a vehicle and a floating platform arranged in operative relationship to the curb and upon which the wheels of the vehicle are adapted to travel.

16. The combination with a roadway and a series of car receiving spaces at the side thereof of guiding curbs adapted to aid in driving a car forwardly into said spaces and guide lines on the roadway along which the driver is adapted to steer the car to bring it into operating association with the curbs.

17. A combination as set forth in claim 16 and wherein the car spaces are identified and corresponding identification means are displayed on the roadway, at the entering ends of the guide lines.

18. A car guiding apparatus including in combination with a pair of guiding curbs, movable platform means associated with the curbs and adapted to yield laterally under the impetus of a car as the latter strikes the curbs, said platform means including a pair of superimposed plates, one of which is pivoted to a stationary support and the other of which is pivoted to the first plate at a point remote from the first mentioned pivot.

19. A car guiding apparatus including in combination with a pair of guiding curbs, movable platform means associated with the curbs and adapted to yield laterally under the impetus of a car as the latter strikes the curbs, said platform means including a pair of superimposed plates, one of which is pivoted to a stationary support and the other of which is pivoted to the first plate at a point remote from the first mentioned pivot, and spring means tending to restrain the independent or simultaneous pivotal movement of the plates.

20. In a garage a bank of car parking spaces and a roadway extending in front of said bank, a pair of converging car-guiding curbs guarding the entrance to each space, and landing platforms occupying the space between the adjacent curbs of adjacent spaces.

Signed at New York in the county of New York and State of New York this 4th day of March, A. D. 1929.

ERNST GEIGER.